Oct. 14, 1947.  L. P. WARREN  2,429,112
FLOATING ELECTRODE-WICK HUMIDIFIER
Filed Dec. 12, 1945  2 Sheets-Sheet 1
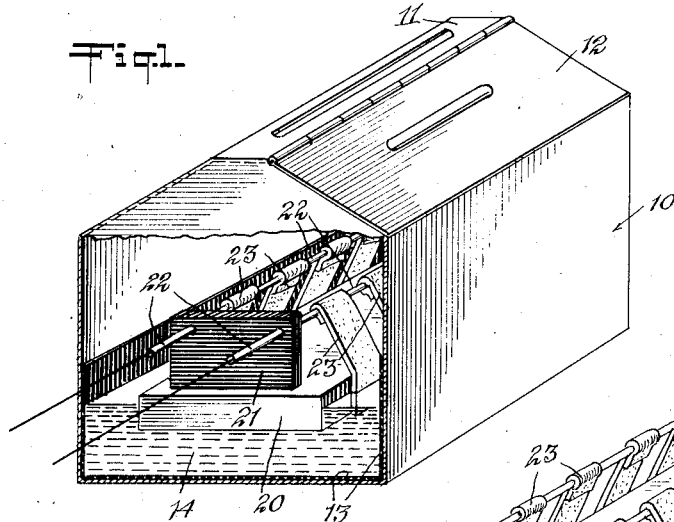
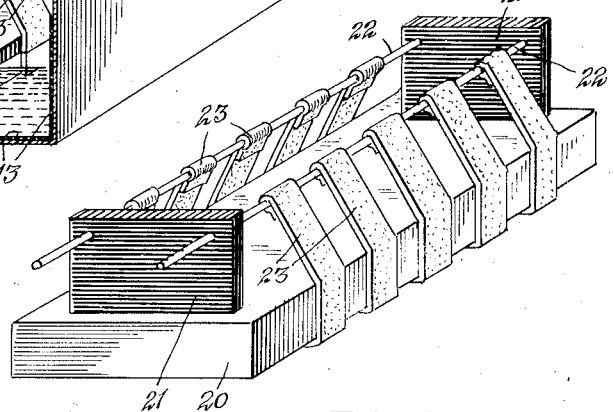
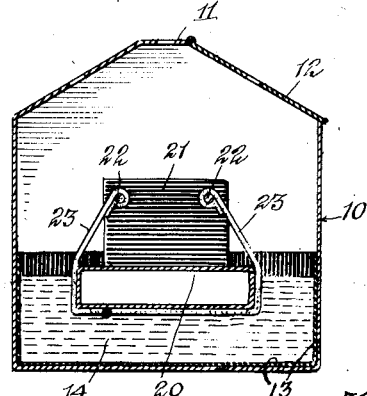
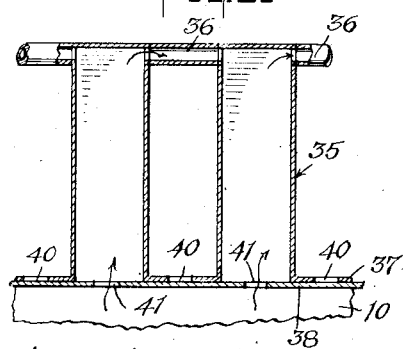
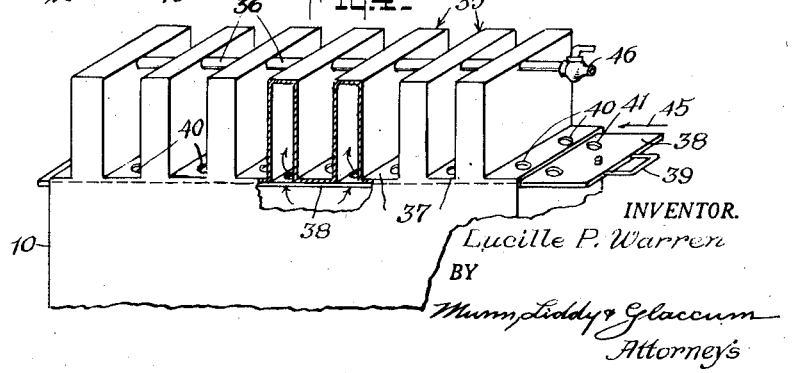
INVENTOR.
Lucille P. Warren
BY
Munn, Liddy & Glaccum
Attorneys

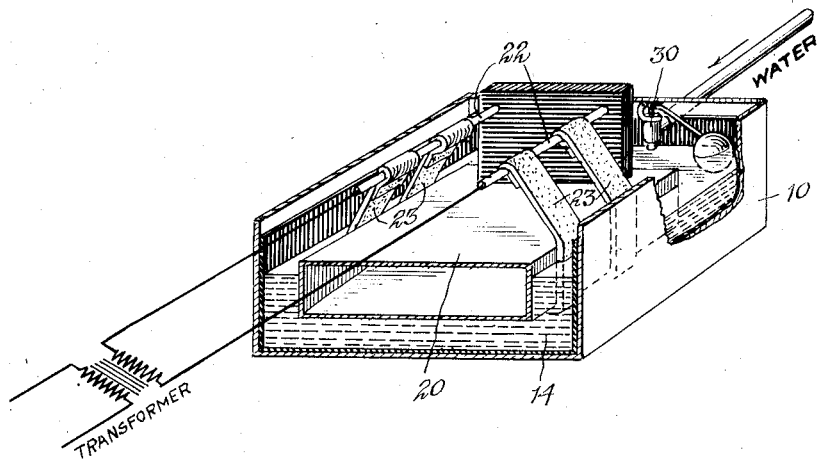

Patented Oct. 14, 1947

2,429,112

UNITED STATES PATENT OFFICE 2,429,112

FLOATING ELECTRODE-WICK HUMIDIFIER

Lucille P. Warren, Louisville, Ky., assignor, by direct and mesne assignments, of one-fifth to Thomas L. Warren and one-fifth to Leonard Stano, both of Bloomfield, one-fifth to Daniel De Sessa, Newark, and one-fifth to George Darche, East Orange, N. J.

Application December 12, 1945, Serial No. 634,607

7 Claims. (Cl. 219—40)

This invention relates to a humidifier for home and industrial use.

The principal object of the invention is the provision of a simple and efficient device for adding water vapor to the air in order to maintain a given relative humidity, said device being also adapted, when desired, to serve as a heating device for increasing the temperature of the surrounding air. This device is also adapted to vaporize deodorants and insecticides and to intermingle said vapor with the surrounding air.

Preferred embodiments of the invention are shown in the accompanying drawing in which—

Fig. 1 is a perspective view of the first embodiment of the invention in which one of the walls of the cabinet or casing of the device is broken away to expose the humidifying element proper;

Fig. 2 is a transverse vertical section through the device shown in Fig. 1;

Fig. 3 is a perspective view of the humidifying device proper;

Fig. 4 is a view of a modified form of the embodiment first above mentioned showing a heat radiating attachment thereto;

Fig. 5 is a fragmentary enlarged vertical section through two of the radiating elements shown in Fig. 4; and Fig. 6 is a perspective view of another embodiment of the invention intended primarily for industrial use, the cabinet or casing in said view being broken away to expose the humidifying device proper as well as the water supply controlling mechanism.

Referring now to Figs. 1 to 3, inclusive, it will be observed that the humidifier is provided with a casing or container 10 having a vented top wall 11 and a hinged vented cover 12 in said top wall. The inner surface of the casing 10 is provided with a coating or layer of dielectric material 13 but, as Fig. 1 shows, this coating need not extend the full height of the inner walls of said casing. This dielectric material is also resistant to water. Carried within the casing 10 and extending below the upper margin of the dielectric coat 13 is a quantity of water 14 of the common sink variety. Carried by the water in said casing is a float 20 which, in the preferred embodiment, comprises a hollow block shaped unit made of material which is adapted to conduct electric current such as copper. Atop the float at each end thereof is a block 21 made of non-conducting or dielectric material and carried by said blocks is a pair of rods 22 which are made of conducting material. Attached to rods 22 are wicks 23 which extend from one rod to the other, around and under the float 20. These wicks are impregnated with salt above a predetermined line which, as a practical proposition, may coincide with the plane of the top wall of the float.

The two rods 22 are connected to a source of electric current by means of the usual appliance cord, having a plug at one end adapted to be inserted into the ordinary receptacle or socket. These elements are not shown in the drawing inasmuch as they are conventional equipment. It will be noted in Figs. 1 and 2 that the float 20 is not entirely submerged in the water but that instead the top wall thereof is completely free of the water. By the same token, only that part of the wicks which extends around and underneath the float is immersed in the water. Water is drawn up into the wicks above the water line by capillary attraction and in consequence the salt in the wicks is caused to dissolve and an electrolytic solution is thereby formed. An electrical connection is thus made between the two rods 22 and electric current is enabled to flow from one of said rods through the wick ends attached to said rod to the float 20, thence across the top of said float and up through the opposite ends of said wicks and into the second of said rods 22. There is sufficient resistance to the flow of the current in said salt-impregnated wicks to generate enough heat to vaporize the water which had been drawn up into the wicks. As the water is thus vaporized, more water is drawn up into the wicks by capillary attraction to replace the vaporized water. This is a continuous process and since the wicks are at all times immersed in the water to a predetermined extent, the capillary flow of the water through the wicks will always remain constant. The quantity of salt in the salt solution in said wicks will also remain constant at all times for the reason that only the water of said solution is caused to vaporize by the process above described—the salt always remaining behind.

Several features of the device above described should now be noted. In the first place, as has already been indicated, it does not matter how much or how little water is contained in the container 10. As long as there is enough water to carry the float 20, there will be a uniform quantity of electrolytic fluid in the wicks and a consequent uniform rate of vaporization will be maintained. In the second place, it will be noted that using a standard 110 volt current, half of the voltage will be expended on one side of the float and the other half on the other side. It has been found that if the full 110 volt current is utilized in a single bank of wicks, the rate of vaporization of the water in said wicks would exceed the rate at which the water supply of said wicks is replenished by the capillary process above noted. It is of course clear that for this device to operate properly the wicks must at all times be fully saturated with the electrolytic solution. Splitting the voltage between the two sides of the float reduces the rate of vaporization to the point where it is exceeded by the rate at which the water is drawn up into the wicks by capillary attraction.

Referring now to Fig. 6, it will be noted that the device therein shown is intended primarily for industrial use. A transformer is provided primarily to isolate the humidifier from the power line. However, this same transformer may also be used for reducing high industrial voltages to usable limits. A float controlled valve 30 is used to control the flow of water into the container and to maintain the water level in said container within predetermined limits.

In the embodiment shown in Figs. 1 to 3, inclusive, the water supply in the container is replenished by the simple expedient of raising the cover or lid 12 and pouring water into the container. This is a satisfactory method for the home owner but for industrial use it is clear that the automatic water replenishing mechanism shown in Fig. 6 is more desirable.

In Figs. 4 and 5 the embodiments above described are shown to be provided with heat radiating elements 35 by which said embodiments may be used not only as humidifiers but also as heating devices. Heat radiating elements 35 comprise a plurality of interconnected chambers which are open to the humidifier at the bottom. Pipes 36 between adjoining elements 35 provide communication among said elements as aforesaid. It will be noted that plates 37 connect adjoining elements 35 at their lower or open ends. These plates, as appears in Fig. 5, may be integral with the sides of said elements 35 and indeed these elements may all be fabricated of a single piece of sheet metal. Slidably mounted between said heating elements and the humidifier proper is a plate 38 having a handle 39 at one end thereof. The handle may be used to move the plate relatively to the heating elements and their adjoining plates 37 for a purpose which will shortly appear. It will be noted that the plates 37 are provided with apertures 40 and that the plate 38 is provided with corresponding apertures 41. It is possible, by moving the plate 38 in the direction of the arrow 45 in Fig. 4, to bring apertures 40 into registration with apertures 41. It is also possible, by moving said plate 38 to the position shown in Fig 4, to bring apertures 41 in said plate into registration with the heating elements 35. This is clearly shown in Fig. 5. When the plate 38 is in the position shown in Figs. 4 and 5, the vapor generated by the humidifier is caused to enter the heating elements 35. When such is the case, these heating elements perform the same function as conventional steam radiators in the home or in business establishments. The valve 46 connected to one of the pipes 36 may be used in this connection to empty the heating elements 35 of the vapor when necessary and it may also be used as a humidifying vent. Thus, when the valve 46 is open and the plate 38 is in the position shown in Figs. 4 and 5, the entire assembly therein shown functions both as a humidifying device and as a heater. When the plate 38 is moved in the direction of arrow 45 in Fig. 4, only its apertures 41 register with apertures 40 in plates 37. Communication between the humidifier proper and the heating elements 35 is cut off and the device may be used only as a humidifying agent.

What have above been described are but preferred embodiments of an invention which is susceptible of many variations and modifications both as to construction and use. For example, without changing the devices shown in the drawing and above described, they may be used to saturate the air with deodorants or insecticides. This may be done by the simple expedient of adding volatile deodorants or insecticides to the water in the container. Also, without changing the devices herein shown and described, it is possible to control their operation by means of a conventional humidostat. Another feature which may be added to the devices forming the subject matter of this application is a fan, conventional in construction and used for the conventional purpose of blowing the vapor generated by the devices herein described and claimed over a wide area. A fan or a blower may be used to force the vapor through a duct from one room to another and in this connection, it will be understood that a humidifier of the character herein described and calimed may be installed in a central location relative to the particular home or building in which it is intended to operate and ducts may be connected to said humidifier which lead to every room in the place. It is thus possible to use a single humidifier to humidify the air of widely separated rooms or to use a separate humidifier in each room.

Insofar as the materials are concerned of which the several parts of the humidifiers herein claimed may be made, it may be said here that conventional materials only are intended to be used. Examples are a sheet metal container having an inner coating of dielectric material such as plastic material or hard rubber. Instead of providing such coating, it is quite possible to use a separate container within the main container, the main container being made of sheet metal and the inner container being made of plastic material or hard rubber. A third possibility also exists, namely, to make the container itself of dielectric material such as plastic material or hard rubber, thus obviating the necessity of providing an inner container of such material or an inner coating of such material.

The float itself is susceptible of being made of different materials. For example, it may be made entirely of copper. When made of such material, the current of electricity which passes through the wicks as above described flows through the top of said float and not through the side walls or the bottom thereof. The reason is that the top wall of the float affords the shortest course for the current of electricity from the wicks on one side thereof to the wicks on the other side. On the other hand, the float may be made of cork or wood or of other dielectric material and a plate made of conducting material may be affixed to the top thereof. The current would flow from one bank of wicks to the other through this plate.

It is further possible, by varying the number of wicks used and changing their dimensions, to make the humidifiers herein described and claimed in different sizes to cover a fairly wide capacity range. The capacity of these humidifiers may also be varied over a wide range by varying the voltage supply. This may be done by any conventional means.

It should also be pointed out that there are many substances other than salt which will provide a suitable electrolytic solution to give the desired effect. The wicks hereinabove mentioned may, therefore, be impregnated with any of these other substances such as minerals instead of salt. The materials which may be used for this purpose are well known in the art and need not here be listed. It should also be understood that instead of impregnating the wicks with salt or these other substances in the first instance, the salt or other substances may be added to the water in the cabinet and the resulting electrolytic solution will be sucked up into the wicks by capillary attraction as hereinabove described. It is important to note that the devices hereinabove described are provided with automatic current shut-offs. When all of the water in the cabinet has evaporated, all that remains in the wicks is the dry salt or other substance and since dry salt does not conduct an electric current, the circuit will be broken and further flow of the current will take place only after the water supply in the cabinet has been replenished.

Another possibility by way of refining the devices herein described and claimed and particularly the first embodiment, is to provide a small scale or rule on top of the float which would project through an aperture in the top wall of the device. This scale or rule would indicate the water level since it would rise and fall with the float. It should also be pointed out that water make up valve 30 shown in Fig. 6 may be controlled by the same float 20 which carries the wicks, thus eliminating the necessity for a separate float.

I claim:

1. A humidifier comprising a container of water, a float carried by the water, a wick carried by the float, the center portion of said wick extending into the water and both ends thereof extending out of the water, and means connecting said wick ends in series in an electric circuit, said wick ends being impregnated with a substance that forms an electrolytic solution with water.

2. A humidifier comprising a container of water, a float carried by the water, said float being made of material that conducts electricity, a wick having salt impregnated ends carried by the float, the center portion of said wick extending around and under said float, the two salt impregnated ends thereof extending above said float and on both sides thereof, and electric conductors connecting said salt impregnated wick ends in series with each other and with the float in an electric circuit.

3. A humidifier comprising a container of water, a float on said water, said float being made of electricity conducting material, a pair of insulators on said float, a pair of rods of electricity conducting material supported by said insulators, a plurality of wicks having salt impregnated ends carried by the float, the center portion of said wicks extending around and under said float, the salt impregnated ends thereof extending above said float and being attached, on one side of said float, to one of said rods, and on the other side of said float to the other of said rods, and electric conductors connecting said rods to a source of electric current.

4. A humidifier comprising a watertight water container made of dielectric material, a float adapted to be carried by the water, said float being provided with a top plate of electricity conducting material, a pair of spaced insulators on said float, a pair of electric conductors supported by said insulators, a plurality of wicks attached at one end to one of said conductors and at the other end to the other of said conductors, the center portions of said wicks extending around and under said float below the water line thereof, the ends of said wicks being impregnated with salt down to said water line, and means connecting said conductors to a source of electric current to complete a circuit extending through one of said conductors, down through the salt impregnated wick ends connected to said conductor, across the top plate of said float, up the salt impregnated wick ends connected to the second conductor and through said second conductor, said wicks being adapted to draw up water by capillary attraction to form an electrolytic solution with the salt therein for the passage of electric current therethrough.

5. A humidifier comprising a container of water, a float carried by the water, a salt impregnated wick on said float extending in part into the water, and means to close an electric circuit through the wick, said container being provided with a heat radiating hood with which it communicates through an apertured member slidably mounted between said container and said hood, said apertured member being movable to close off the container from said heat radiating hood and to open said container to the atmosphere, said humidifier comprising a heating device when the container and the hood are in communication with each other and comprising a humidifying device when the container is in communication with the atmosphere.

6. A humidifier which is connected to a source of electric current, said humidifier comprising a container of water, a float carried by the water, a wick on said float extending in part into the water, said wick being impregnated with a substance that forms an electrolytic solution with water, said wick being adapted, by capillary action, to draw water up into its exposed portion, thereby becoming an electrical conductor, and means connecting said source of electric current to said wick and closing an electric circuit therethrough, the resistance of said wick to the electric current which passes therethrough being sufficiently high to generate enough heat to evaporate the water which is drawn up into its exposed portion.

7. A humidifier in accordance with claim 6 in which the container of water is provided with a heat radiating hood with which said container communicates, said hood confining the vapor generated by said humidifier for use as a heating agent in said hood.

LUCILLE P. WARREN.

REFERENCES CITED

The following references are of record in the file of this patent:

UNITED STATES PATENTS

| Number | Name | Date |
| --- | --- | --- |
| 1,154,113 | Hadaway | Sept. 21, 1915 |
| 1,258,231 | Lucas | Mar. 5, 1918 |
| 1,292,657 | Simon et al. | Jan. 28, 1919 |
| 1,685,266 | Baum | Sept. 25, 1928 |